April 16, 1968     S. E. PALAZZOLO ET AL     3,378,433

POSTFORMABLE DECORATIVE LAMINATES

Filed May 31, 1961

WITNESSES:
Wm. C. Groome
Charles L. Board

INVENTORS
Salvatore E. Palazzolo &
William C. Hood.
BY
William J. Addison
ATTORNEY

United States Patent Office 3,378,433
Patented Apr. 16, 1968

3,378,433
POSTFORMABLE DECORATIVE LAMINATES
Salvatore E. Palazzolo and William C. Hood, Varnville, S.C., assignors to Westinghouse Electric Corporation, East Pittsburgh, Pa., a corporation of Pennsylvania
Continuation-in-part of abandoned application Ser. No. 813,569, May 15, 1959. This application May 31, 1961, Ser. No. 116,650
3 Claims. (Cl. 161—156)

This invention relates to decorative laminates and particularly to decorative laminates that can be postformed to complex curved shapes.

This application is a continuation-in-part of application Ser. No. 813,569, filed May 15, 1959, now abandoned by Salvatore E. Palazzolo and William C. Hood, and assigned to the present assignee.

Decorative laminates are employed for making table tops, desk tops, sink counters and other members. In making members such as sink counters with integral splash board and rounded edges it is desirable to have available postformable decorative laminates that can be postformed to desired curvature on the job or in the job shop.

Thus, for on-the-job shaping of decorative laminates, it is important to have available a postformable decorative fully cured laminate of relatively flat shape which, upon simple heating, will become sufficiently formable that it can be shaped under low pressures to any desired shape in simple wood, plaster, or other inexpensive forms of molds and, upon cooling, the member will retain the complex curved shape imparted to it by the forms or molds. These laminates must be capable of being postformed to shapes with curvature to arcs of radii of less than 1 inch for a thickness of from about $\frac{3}{64}$ to $\frac{1}{16}$ inch.

Heretofore the physical properties of non-postformable grades of decorative laminates have been superior to the available postformable grades. Usually the laminator would not employ the postformable decorative laminates for any application where he could employ the superior non-postformable grade. Thus, it was usually necessary for the laminator to duplicate his inventory. That is, the laminator would maintain one supply of decorative laminates for applications requiring no postforming of the member, and a second supply of decorative laminates to meet postforming requirements.

This invention is directed to decorative laminates that are postformable and which possess the physical properties heretofore found only in the non-postformable laminates.

The universal grade decorative laminate of this invention thus can be readily and easily employed by the trade in both postforming applications and in non-postforming applications. Thus, a supply of this one grade laminate will meet the requirements of the laminator in both postforming and non-postforming applications.

The object of this invention is to provide a decorative surfaced resinous laminate that will possess any desirable patterned decorative surface and that can be postformed in thickness of about $\frac{3}{64}$ to $\frac{1}{16}$ inch to arcs of a radius of less than 1 inch.

Another object of this invention is to provide a decorative laminate having a decorative surface and a body comprised of a selected resin and selected paper sheet material, which laminate can be satisfactorily employed in both postforming and non-postforming applications.

A further object of this invention is to provide postformed laminates from relatively flat sheets of a fully cured composite laminate having a decorative surface and a body comprised of a selected resin and selected paper sheet material.

Other objects of the invention will, in part, be obvious and will, in part, appear hereinafter.

For a better understanding of the nature and objects of this invention, reference is made to the following detailed description and drawing, in which.

Figure 1:
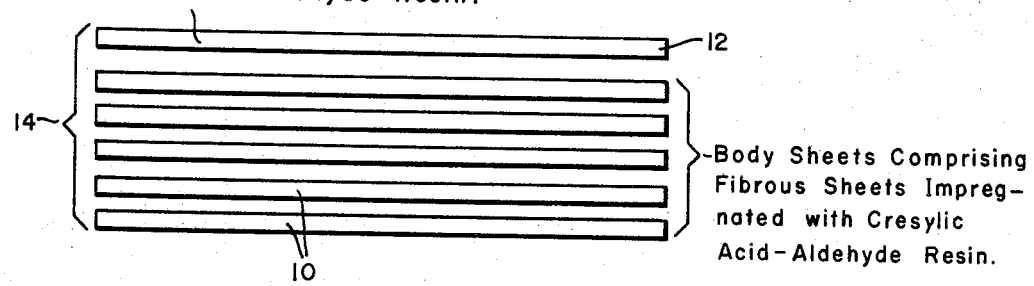
FIGURE 1 is a view in elevation showing a stack of sheets to be molded into a laminated member.

In accordance with this invention there is prepared a composite laminate of about $\frac{3}{64}$ to $\frac{1}{16}$ inch thickness having a decorative surface of practically any desired color or pattern, which is cured in a relatively flat condition and which can be postformed into complex shaped members having curves or arcs of less than 1 inch radius without rupturing or otherwise deforming undesirably.

In particular, it has been discovered that such composite laminates may be prepared by combining a plurality of body or core sheets of a specific stretchable or extensible fibrous material impregnated and bonded together with from about 28% to about 100% of its weight of a thermoset resin characterized by postforming characteristics which will be discussed with more particularity hereinafter, a decorative layer applied thereto, the decorative layer comprising a sheet of fibrous material with a predetermined pigment or pattern and carrying from about 35% to about 135% of its weight of a clear resinous material and/or an overlay sheet carrying from about 100% to about 250% of its weight of a clear resinous material. The clear resinous material is preferably a clear melamine-aldehyde resin.

Thus, the composite decorative laminates of this invention will comprise a core or body layer comprising a plurality of sheets of a particular fibrous sheet material, which will be detailed more fully hereinafter, impregnated with a thermoset resin and a decorated surface layer impregnated with a clear melamine-aldehyde resin.

The decorated surface layer may comprise a sheet of alpha-cellulose paper, thin cotton fabric, silk, glass fabric, asbestos paper or like fibrous sheet material with a design imprinted thereon or the sheet may be pigmented throughout. The thickness of the sheets employed will usually be of the order of 5 to 12 mils. Pigmented sheets with designs imprinted thereon may also be employed. Ordinarily, a resin impregnated protective overlay sheet is employed over sheets having designs imprinted thereon to provide better abrasion resistance and good surface appearance thereto. Pigmented sheets that have no design imprinted therein will ordinarily have good abrasion resistance and hence an overlay sheet is not usually required. Suitable materials for overlay sheets include rayon, glass fabric and alpha-cellulose paper. These sheets will usually be of a thickness of the order of from 1 mil to 6 mils. In accordance with this invention, when an overlay sheet is employed, it will be impregnated with a clear resinous material as hereinbefore stated.

The specific paper sheet material employed in preparing the core stock of this invention is a low-stretch paper, preferably kraft paper, prepared in accordance with the method described in U.S. Patent 2,624,245 to Sanford L. Cluett. This paper is available commercially under the proprietary name Clupak.

The stretchable paper prepared in accordance with the method disclosed in U.S. Patent 2,624,245 to Sanford L. Cluett is a paper web, such as a strip having plain parallel surfaces with constituent fibers of the material distorted and locally flexed and crowded together by compression of the web in directions parallel with such surfaces. The distorted, locally flexed and crowded fibers are cementitiously held together by the finely beaten fibrils and the natural adhesives that are the product of the beaten pulp as well as by the molecular attractive forces that are made possible by the extremely intimate contacts of the fibrillated material. The amount of compression of the web and the distortion, flexing and crowding of the fibers is sufficient to impart a marked and controllable and useful stretchability or extensibility to the web and also, generally, an increased density.

Thus the paper sheet material employed in this invention is a relatively dense uncreped kraft paper web formed of water laid, adherent cellulose fibers in their natural physical shape, said web having smooth, substantially parallel faces and substantial extensibility in a direction parallel to its faces, continuous throughout in said direction of extensibility and well in excess of its primitive elastic limit. The fibers have been crowded and pushed together uniformly over the web, in the direction parallel to the faces of the web, in the space between the faces of the web as laid, to provide such extensibility. The crowded and pushed together fibers have between them, in that relation, a bond due to initial drying which gives maximum and continuing resistance to permanent elongation in the direction parallel to the faces of the web short of rupture of the web.

The process of preparing such an uncreped paper comprises heating the web, while in the physical condition it possesses as it leaves the wet end of a paper making machine, until a part only of the moisture of the web has been removed. The paper after the removal of sufficient water to produce a coherent structure, but before drying, is submitted to a process which introduces a distortion of the longer fibers by contracting the area in which they lie and thus the length of the sheet, but without decreasing the actual length of the fibers themselves, while at the same time holding the surfaces of the paper web flat and parallel and preventing thickening of the web. During this operation a heavy pressure is maintained on the web so as to prevent creping of the web and also for the purposes of forcing the distorted fibers into voids within the paper web so as to bring the fibers into such close contact with each other and with the entangled fibrils as to cause strong bonding and adhesions within the web. Upon subsequent drying, the modified orientation of the fibers and fibrils is retained in the dry state and the sheet takes on firmness and strength from the mutual adherence of the finely entangled fibrils and other small structures.

The extensibility or stretchability of this uncreped paper is distinguished from that produced by creping in that the extension of the paper employed in this invention involves extension of distorted fibers within the body defined by plain parallel faces of the sheet of the web material without any observable decrease in thickness of the web, whereas extension of creped paper takes place primarily by straightening out of bodily folded or creased zones of the web with resultant decrease of thickness of the web. For the purposes of this invention the thickness of the extensible uncreped kraft paper may vary from about 5 to 20 mils. The preferred paper thickness is about 11 mils.

Reference is hereby made to Patent 2,624,245 to Cluett for a detailed description of the process of producing the relatively dense uncreped paper employed in this invention.

EXAMPLE I

Uncreped kraft paper prepared in accordance with the process of patent 2,624,245, above referred to and which is employed in this invention has the following properties:

| | | |
|---|---|---|
| Basis weight | pounds | 101.2 |
| Moisture | percent | 5.5 |
| Caliper | inches | 0.0101 |
| Tear strength, cross direction | grams | 268 |
| Tear strength, machine direction | do | 206 |
| Stretch, cross direction | percent | 3.9 |
| Stretch, machine direction | do | 9.7 |
| Tensile strength, cross direction | grams | 29.7 |
| Tensile strength, machine direction | do | 45.3 |

It has been discovered that the above described stretchable paper possesses physical characteristics, subsequent to lamination, which present serious difficulties in its use in manufacturing postformable decorative laminates. While the use of the particular paper is highly desirable, it cannot be used in conjunction with the prior art thermoset postformable resins. Usually, those engaged in the art have employed creped paper impregnated with one or more of the aniline-modified phenol-aldehyde resins. When laminates are so prepared, their postforming properties are adequate due to the manner in which the creped paper stretches, bends, and is compressed. However, when similar laminates are prepared from the above described uncreped stretchable paper, their postforming properties are prohibitively reduced. This is due to the thermal instability of the conventional resins and to the relative stiffness of the uncreped paper at the temperature at which the resins soften. The result is that decorative laminates prepared from uncreped paper according to the prior art procedures have been completely unsuitable for use in postforming operations because they either crack or blister during the postforming operation.

It was discovered, quite unexpectedly, that a class of resins which are not normally thought of as useful for postforming operations may be employed to impregnate the uncreped stretchable paper described above. Together with suitable decorative and surface sheets, the so impregnated uncreped paper may be processed into highly desirable decorative laminates having outstanding postforming characteristics and desirable physical properties. Generically, the group of resins which may be employed according to the method of the present invention are those which possess the ability to soften, subsequent to thermal curing, at temperatures within the range from about 150° to about 170° C. which conforms to the softening point of the cured melamine-aldehyde resins employed in the surface sheets. The resins have the ability to withstand these relatively high temperatures and for longer times before generating volatile matter through decomposition which would cause blistering of the laminate.

Among the resins which are applicable are those which are commonly termed cresylic acid-formaldehyde resins which have been catalyzed by a basic agent. As is well known in the art, cresylic acid available commercially comprises a small amount of phenol, large amounts of three cresols and a considerable amount of the several xylenols. For example, the cresylic acid may contain about 5% of phenol and the remainder cresols and xylenols. However, cresylic acids containing up to as much as about 35% of phenol and the remainder cresols and xylenols may be employed in the invention. Other suitable resins include:

(1) Properly cured epoxide resins based on the reaction of bisphenol-A and epichlorohydrin;

(2) Properly cured epoxide resins based on the reaction of epichlorohydrin and phenolic or cresylic novolaks;

(3) Blends of the above epoxide resins and phenol (and/or cresylic acid) formaldehyde resins;

(4) Phenol-formaldehyde resins properly plasticized with rosins, and/or lignins, and/or modified lignins; and (5) Cresylic acid-formaldehyde resins properly plasticized with rosins, and/or lignins, and/or modified lignins.

In a specific example of the invention, sheets of extensible uncreped kraft paper may be impregnated with a thermosettable cresylic acid-aldehyde resin. The cresylic acid-aldehyde resin is derived by reacting cresylic acid with an aldehyde such as acetaldehyde, butyl aldehyde, formaldehyde, paraformaldehyde, or other derivatives of formaldehyde, in the presence of an alkaline catalyst such as ammonia, calcium hydroxide, lime, or barium hydroxide. A volatile solvent such as ethanol, methanol, toluene, or xylene is added to the resinous composition to produce an impregnating varnish. The resinous solids content of the varnish may be varied from about 20% to about 70% by weight.

In preparing the illustrative cresylic acid-aldehyde resin it is preferred to employ a cresylic acid composition consisting essentially of, by weight, from about 20% to 40% of meta-cresol, from about 15% to 35% of para-cresol, from about 20% to 40% of 3,5-xylenol and the balance being other xylenols. Other xylenols that may be present are 2,3-xylenol, 2,4-xylenol, 2,5-xylenol, 2,6-xylenol and 3,4-xylenol. In some instances, however, up to about 35% by weight of phenol (hydroxy benzene) may also be present in the cresylic acid employed.

The following example sets forth a specific cresylic acid composition that may be employed in the preparation of the resin employed in this invention:

EXAMPLE II

| | Percent |
|---|---|
| Meta-cresol | 32 |
| Para-cresol | 23 |
| 3,5-xylenol | 30 |
| Other xylenols | 15 |

The cresylic acid-aldehyde resin is prepared by reacting one mole of the cresylic acid composition and from about 0.9 mole to 1.3 mols of an aldehyde, preferably formaldehyde, in a closed reaction vessel under reflux conditions (about 100° C.) for a period of time of at least one hour, the reaction being catalyzed by an alkaline catalyst such as ammonia and then vacuum dehydrated to remove substantially all water from the reaction product.

The following is an example of the preparation of a cresylic acid-aldehyde resin that can be satisfactorily employed in this invention.

EXAMPLE III

Into a steam heated reaction kettle there are introduced the following:

| | Lbs. |
|---|---|
| Cresylic acid of Example II | 1150 |
| Formaldehyde (37%) | 840 |
| Ammonia (28%) | 25 |

These ingredients are reacted in the steam heated reaction vessel at a temperature of approximately 100° C. under reflux conditions for a period of about 1½ hours. The mixture is then dehydrated under a vacuum of 28 inches of mercury, and the temperature gradually increased to about 110° C. during dehydration. Substantially all the water is removed. To the hot reaction product there is then added 700 lbs. of 95% ethanol to produce a resinous impregnating varnish. This resinous varnish has a viscosity at 25° C. of from about 200 to 400 centipoises, a specific gravity at 25° C. of from 1.010 to 1.030, a set time at 153° C. of from about 16 to 21 minutes and a pH at 25° C. of from about 7.0 to 7.2. Resin solids content is about 50% by weight. Where desired, suitable extenders or plasticizers such as FF wood rosin, lignins or modified lignins may be added to the extent of about 35% by weight of the resin solids.

The sheets of stretchable kraft paper may be impregnated with the resin varnish in any conventional manner, for example, as described in the patent to Weltman et al., Patent No. 2,579,637. It is important, for the purposes of this invention to employ a resin ratio of the impregnant within the relatively narrow range of from 1.28 to 2.00. Resin ratio is defined as the ratio of the weight of the untreated sheet plus the weight of the resin that is impregnated in the sheet to the weight of the untreated sheet. In other words, the treated sheet material carries resin in an amount equal to from about 28% to 100% of the sheet material alone.

Thus, the extensible uncreped kraft paper sheeting is dipped in the varnish one or more times until it has picked up resin solids in an amount of from 0.28 to .70 times the weight of the dry paper and the varnish impregnated paper is passed through an oven or other dryer after each dip to remove the volatile solvent. During drying, it is desirable to heat the paper treated with the varnish composition at a temperature of from 110° to 160° C. in order to remove the solvent therefrom promptly and to advance the cure of the resin well into the B stage. The heat treatment of the applied resin at this stage is conducted so that the resulting treated fabric has a "greenness" of from 0.5% to 8%. The greenness is determined by placing a stack of small pieces of the resin treated sheet material in a hot press and pressing it at a temperature of 175° C. and a pressure of 1000 pounds per square inch for 5 minutes, and then measuring the amount of resin that is forced out of the stack, that is, the resin that extends beyond the fibrous sheet material proper, and determining the proportion of this exuded resin to the total weight of the sample.

It is also essential that the greenness be controlled and kept within the above limits. It is important to have adequate greenness so that a homogeneous laminate is obtained. However, if the greenness is too high, a bursting of the paper fibers is encountered during the laminating process and the resin tends to flow into the decorated layer causing a discoloration of same. Other examples of resins which can be satisfactorily employed in this invention are as follows.

EXAMPLE IV

A resin prepared as described in Example III—200 parts FF wood rosin (60% solution in isopropyl alcohol)—25 parts. These ingredients are mixed in a reaction vessel at room temperature and the resulting resin used to impregnate stretchable kraft paper as described in Example III.

EXAMPLE V

| | Parts |
|---|---|
| A resin as described in Example VII | 23.8 |
| An epoxide resin produced by the reaction of epichlorohydrin and Bisphenol A | 17.8 |
| Toluol | 4 |

These ingredients are mixed in a reaction vessel and the resulting resin used to impregnate stretchable kraft paper as described in Example III.

EXAMPLE VI

Into a steam heated reaction kettle there are introduced the following:

| | Parts |
|---|---|
| Phenol | 300 |
| Formaldehyde (37%) | 315 |
| Sodium hydroxide | 1 |

These materials are reacted in a reaction vessel at a temperature of about 100° C. under reflux conditions for 45 minutes. The reactor is then set for distillation and the reaction continued under atmospheric distillation conditions for 45 more minutes. The reactor is then set for vacuum distillation and the batch vacuum distilled until a batch temperature of 120° C. (at 20–25 inches of mercury vacuum) is reached. The batch is then cooled and 140 parts of ethanol added. Also 1 part of sodium hydroxide and 100 parts of a 60% solution of FF wood rosin in isopropyl alcohol are added. The resulting resin is then used to impregnate stretchable kraft paper as described in Example III.

The decorated sheet material and protective overlay, if one is employed, are impregnated respectively with at least 35% and 100% of their weights with a clear thermosetting melamine-aldehyde resin. It will be appreciated that in many cases, the melamine-formaldehyde resins are made in the presence of butanol and that they comprise butylated polymers. However, the term "melamine-aldehyde" is intended here to apply to such compositions which comprise essentially the following reactants as the main ingredients:

Melamine crystals,
Formaldehyde 37% solution,
Methyl alpha-D Glucoside,
Ortho/para toluene sulphonamide, reacted as described in John K. Mangrame et al. Patent No. 2,773,788.

The ingredients other than melamine and formaldehyde serve to provide special plasticity properties as described in the Patent No. 2,773,788. They are not a limiting factor in this patent application since many other plasticizing ingredients are known to serve a similar purpose. The formulation does, however, serve to described a typical melamine aldehyde composition suitable for use as a part of this plastic construction.

Referring to FIG. 1 of the drawing, there is illustrated an assembly of a stack of resin treated sheets to be employed in preparing a composite decorative laminate in accordance with this invention. A plurality of body or core sheets 10 comprising the stretchable uncreped kraft paper hereinabove described impregnated with approximately 50% of their weight of any of the resins hereinabove described are superimposed on each other and topped with a surface sheet 12 impregnated with a clear melamine-aldehyde resin. The entire assembly forms a stack 14, which is then ready for molding. The stack 14 is placed in a flat bed press with stainless steel plates in contact with the surface sheet 12. The stack is then molded at a pressure of from about 500 to 1500 pounds per square inch at a temperature of from about 125° C. to 160° C. for a period of time of about ½ to 2 hours, then cooled and withdrawn from the press.

Figure 2:
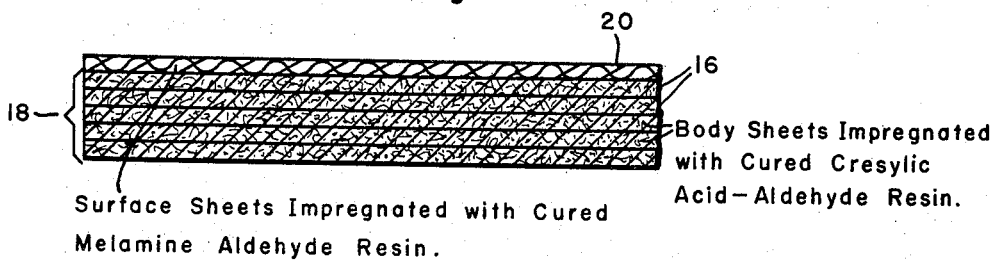
FIG. 2 is a cross section through a laminate prepared from the stack shown in FIG. 1; and, FIG. 3 is a cross section through a postformed sink top.

The resulting laminate 16 as shown generally in FIG. 2 of the drawing has a thickness of about 1/16". The body sheets have been united into a fully cured body 18, which is firmly bonded to a fully cured resinous top surface 20. The surface 20 is glossy and is of a light clear color.

It has also been determined in accordance with this invention that at least one, and preferably two, sheets of conventional kraft paper impregnated with from about 35% to 80% of its weight of a standard thermosettable phenolic resin can be inserted or sandwiched between surface sheet 12 and the core sheets 10 prior to molding to produce, upon molding, a unitary composite laminate having excellent resistance to cracking during postforming. Conventional kraft paper of a thickness of from about 5 to 20 mils may be employed.

The preferred standard thermosettable phenolic resin is one derived by reacting 1 mole of a phenol and from 0.9 mole to 1.7 moles of formaldehyde under reflux conditions for at least one hour. The reaction being catalyzed by an alkaline catalyst such as ammonia, sodium hydroxide, lime, etc. and then vacuum dehydrated at a temperature not exceeding 100° C.

The following example illustrates the preparation of such a resin.

EXAMPLE VII

Into a steam heated reaction vessel there are introduced the following:

| | Parts by weight |
|---|---|
| Phenol (hydroxy benzene) | 110 |
| Formaldehyde (37%) | 104 |
| Ammonia (28%) | 3.75 |

These materials are reacted in the reaction vessel at a temperature of about 100° C. under reflux conditions for 1½ hours. The mixture is then dehydrated under a vacuum of 28 inches of mercury, and the temperature gradually increased to about 75° C. during dehydration. Substantially all water is removed. A solvent such as 95% ethanol is added to provide an impregnating varnish. Where desired, suitable extenders or plasticizers such as rosin, lignin, or modified lignins may be added to the extent of about 35% by weight of the resin solids.

EXAMPLE VIII

In accordance with this invention six 12 inch square sheets of stretchable uncreped kraft paper having a thickness of about 10 mils are impregnated with the resin of Example III to a resin ratio of 1.45 and a greenness of 4%. The sheets are stacked in a manner similar to that shown in FIG. 1 with a decorative sheet of alpha cellulose paper impregnated with 100% of its weight of clear melamine-aldehydride resin on top. The stack is consolidated by molding for 30 minutes at a pressure of 1200 pounds per square inch and at a temperature of 135° C. After cooling, the core of the laminate is machined to provide a laminate of .050 inch in thickness.

The laminate is heated to about 163° C. in 60 seconds by an infra-red heater and postformed to an angle of 90° with a radius of curvature of ¾ inch, without substantial loss of gloss or other physical properties.

In accordance with Example VIII other sample laminates were prepared for tests under N.E.M.A. specifications. The results of these tests, set forth in Table I below, indicate that the decorative postformable resinous laminates of this invention not only meet N.E.M.A. requirements for postformable grades of decorative laminates but also the rigid requirements for non-postformable grades.

Table I

| | |
|---|---|
| Resistance of surface to cigarette burns | 111 seconds. |
| Immersion in boiling water | No crazing, chalking or delamination. Increase in thickness 9.5%. Increase in weight 7.5%. |
| Flexural strength | 22,875 p.s.i., LW, face in tension. 18,300 p.s.i., CW, face in tension. |
| Modulus of elasticity | 1,050,000 p.s.i. |
| Formability (Bend) | No cracking, blistering or delamination when tested in accordance with LP-2-2.11. |

Figure 3:
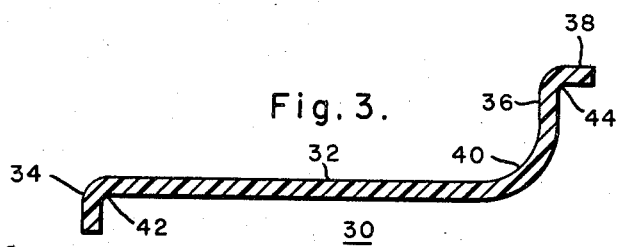

Referring to FIG. 3 of the drawing there is illustrated a cross section to a sink or counter top or drain board 30 postformed from a flat, fully cured laminate as shown in FIG. 2. The sink top 30 comprises a flat working surface 32, a front edge 34, a splash board 36 and a rear edge 38 joined with rounded corners at 40, 42 and 44. The size and the shape of these portions and the radii of the corners may be varied readily and within wide limits by the workmen to suit the job. Adjustable maple forms, for instance may be employed to shape a flat sheet of the laminate and the low pressures after it has been heated to about 165° C. to the shape 30, and after cooling to below 100° C., pressure may be released and the shaped decorative laminate may be withdrawn from the mold and installed in place.

The decorative laminates of this invention can be postformed readily in simple wood or plaster or other inexpensive molds at moderate pressures by first heating the laminate to a temperature of from about 140° C. to 190° C. and placing it in the molds or forms, whereby the laminate is easily shaped at low pressures of about 25 p.s.i. to any desired complex shape having curves of a relatively sharp radius. When cooled in such molds to a temperature of below 100° C., the laminate will retain the shape imparted to it by the mold. Using the composite laminate, the craftsman can readily prepare many decorative members, such as table tops, sink tops, counters, and other household and commercial products with various curves and shapes on the spot or in a job shop to suit the requirements of the installation. This enables the preparation of substantially seamless, rounded members with smooth, glossy surfaces.

It is to be understood that the above description and drawing are illustrative of the invention and not in limitation thereof.

We claim as our invention:

1. A composite decorative postformable resinous laminate comprising (A) an overlay sheet of fibrous material impregnated with a clear, thermoset melamine-aldehyde resin, (B) a decorative layer comprising a decorated sheet of fibrous material impregnated with a thermoset melamine-aldehyde resin, and (C) a body layer comprising a plurality of sheets of a stretchable, relatively dense, uncreped paper web formed of water laid, adherent cellulose fibers in their natural physical shape impregnated with from about 28% to about 100% of its weight of a thermoset resin consisting of a mixture of a rosin-modified phenol-formaldehyde resin and an epoxide resin derived from the reaction of bisphenol-A and epichlorohydrin, said thermoset resin characterized by thermal stability, desirable post-forming property, and a post-forming softening point range of from about 150° C. to 170° C.

2. A composite decorative postformable resinous laminate comprising (A) an overlay sheet of fibrous material impregnated with a clear, thermoset melamine-aldehyde resin, (B) a decorative layer comprising a decorated sheet of fibrous material impregnated with a thermoset melamine-aldehyde resin, and (C) a body layer comprising a plurality of sheets of a stretchable, relatively dense, uncreped paper web formed of water laid, adherent cellulose fibers in their natural physical shape impregnated with from about 28% to about 100% of its weight of a thermoset resin consisting of a rosin-modified cresylic acid-formaldehyde resin, said thermoset resin characterized by thermal stability, desirable post-forming property, and a post-forming softening point range of from about 150° C. to 170° C.

3. A composite decorative postformable resinous laminate comprising (A) an overlay sheet of fibrous material impregnated with a clear, thermoset melamine-aldehyde resin, (B) a decorative layer comprising a decorated sheet of fibrous material impregnated with a thermoset melamine-aldehyde resin, and (C) a body layer comprising a plurality of sheets of a stretchable, relatively dense, uncreped paper web formed of water laid, adherent cellulose fibers in their natural physical shape impregnated with from about 28% to about 100% of its weight of a thermoset resin consisting of a phenol-formaldehyde resin modified with rosin, said thermoset resin characterized by thermal stability, desirable post-forming property, and a post-forming softening point range of from about 150° C. to 170° C.

References Cited

UNITED STATES PATENTS

| | | | |
|---|---|---|---|
| 3,131,116 | 4/1964 | Pounds | 161—258 |
| 2,664,377 | 12/1953 | Van Beckum et al. | 161—268 |
| 3,018,206 | 1/1962 | Hood et al. | 156—310 |
| 3,054,428 | 9/1962 | Crawford | 161—258 |
| 2,383,430 | 8/1945 | Weltman. | |
| 2,624,245 | 1/1953 | Cluett | 162—206 |
| 2,694,028 | 11/1954 | Rapp | 156—310 X |
| 2,801,198 | 7/1957 | Morris et al. | 154—43 |
| 2,810,674 | 10/1957 | Madden. | |

FOREIGN PATENTS 527,994  4/1954  Belgium.

ROBERT F. BURNETT, *Primary Examiner.*

CARL F. KRAFFT, EARL M. BERGERT, JACOB STEINBERG, *Examiners.*

M. E. ROGERS, W. J. VAN BALEN,
*Assistant Examiners.*